United States Patent Office 3,218,364
Patented Nov. 16, 1965

3,218,364
PURIFICATION OF PERFLUOROOLEFINS AND CHLOROPERFLUOROOLEFINS
Yutaka Kometani, Tatsuo Sueyoshi, and Masayoshi Tatemoto, Osaka, Japan, assignors, by mesne assignments, to Thiokol Chemical Corporation, Trenton, N.J., a corporation of Delaware
No Drawing. Filed Mar. 6, 1963, Ser. No. 263,120
Claims priority, application Japan Dec. 30, 1962
9 Claims. (Cl. 260—653.3)

This invention relates to the purification of fluoroolefin monomers and, more particularly, to a process for purifying monomeric (perfluoroolefins and fluorochloroolefins) of the minute traces of olefinic impurities which tend to decrease the thermal stability of any polymer produced from such fluoroolefin monomers. The invention also provides an improved process for purifying trifluorochloroethylene and tetrafluoroethylene.

Among the many thermoplastic resins which are presently commercially available, the high molecular weight polyfluoroolefins are generally recognized by many polymer chemists as having outstanding physical characteristics, although they are somewhat difficult to mold because of their high melting points. Frequently, molding polyfluoroolefins such as polytrifluorochloroethylene or polytetrafluoroethylene requires temperatures in excess of 300° C., at which temperatures there is often a tendency for the polymer, upon cooling, to undergo a marked diminution in its physical characteristics, such as its tensile strength. This phenomenon is especially noticeable when the polymer is subjected to heat aging at temperatures in excess of 300° C. over prolonged periods of time.

During the exhaustive investigation which we and our colleagues at the laboratories of Osaka Kinzoku Kogyo Co., Ltd. (now known as Daikin Kogyo Company, Ltd.), Osaka, Japan have conducted into various aspects of the production of monomeric fluoroolefins and polyfluoroolefins, we have found that the inability of polyfluoroolefins to withstand heat aging at temperatures in excess of 300° C. without undergoing any change in their physical properties is due to the presence in the fluoroolefin monomer of minute traces of certain olefinic impurities which tend to decrease the thermal stability of any polymer produced from such fluoroolefin monomer. Inasmuch as all fluoroolefin monomers used in commercial polymerization process are prepared either by the pyrolysis of saturated perfluoroalkanes, the dehalogenation of dihaloperfluoroalkanes, or the dehydrohalogenation of hydrohaloperfluoroalkanes, it is impossible to prevent the formation of these olefinic impurities. Apparently, even the normal work-up by distillation of most fluoroolefin monomers is insufficient to remove the last minute traces of these olefinic impurities.

By gas chromatographic analyses of different fluoroolefin monomers, we have been able to identify these olefinic impurities (which are present in the monomer in concentrations as low as parts per million) as compounds in which the unsaturated carbon atoms contain at least one atom other than fluorine and carbon atoms.

Depending upon the particular perfluoroolefin or fluorochloroolefin examined, we have isolated and identified such olefinic impurities as vinylidene fluoride, trifluoroethylene, 1,1-dihydroperfluorononene, vinyl chloride, vinylidene chloride, vinyl fluoride, 1,1,6-trihydroperfluorohexene-1, and others. Each of these olefinic impurities is characterized by at least one hydrogen atom on one of the unsaturated carbon atoms and, moreover, contains no elements other than carbon, fluorine, chlorine and hydrogen.

We have now found that by treating the fluoroolefin monomer with an aqueous solution of sulfuric acid, it is possible to selectively absorb these olefinic impurities in the sulfuric acid and thereby improve the thermal stability of the polyfluoroolefin produced by the radical-induced polymerization of the treated monomer. Based on these discoveries, the invention provides an improved process for purifying a fluoroolefin monomer of the minute traces of olefinic impurities which tend to decrease the thermal stability of any polymer produced from such fluoroolefin monomer, which comprises treating the monomer with an aqueous solution of sulfuric acid to remove from the monomer those olefinic impurities in which the unsaturated carbon atoms contain at least one atom other than fluorine and carbon atoms.

The process of the invention is applicable to many perfluoroolefin and fluorochloromonomers, including such monomers as tetrafluoroethylene, hexafluoropropene, octafluorobutene, perfluorocyclobutene, perfluorooctene, perfluorononene, and trifluorochloroethylene. Treatment of the fluoroolefin monomer may be accomplished by scrubbing gaseous fluoroolefin monomer with sulfuric acid or by liquid-liquid extraction. Although a wide range of concentrations of sulfuric acid may be used in the treatment of fluoroolefin monomer in accordance with the process of the invention, we have obtained particularly advantageous results using aqueous solutions of sulfuric acid in which the sulfuric acid concentration ranged from about 50 to about 98 percent by weight, and preferably in the range from about 80 to about 98 percent by weight.

The precise process conditions employed to remove the olefinic impurities from fluoroolefin monomers in accordance with the invention depend upon the particular monomer being purified. As a general rule, the fluoroolefin monomer should be treated with an aqueous solution of sulfuric acid having a concentration in the range from about 50 to about 98 percent by weight, at a temperature in the range from ambient room temperatures to about 150° C. for a period of time in the range from about 10 seconds to about 30 minutes, and preferably using about 5 percent by weight of the sulfuric acid solution at temperatures ranging from room temperature to about 100° C. for periods of time in the range from about 30 seconds to about 10 minutes. Temperatures in excess of 150° C. frequently cause the fluoroolefin monomer to undergo polymerization, and hence should be avoided.

The effect of varying the sulfuric acid concentrations and reaction temperature on the rate of absorption of various fluoroolefins is set forth in Table I. To determine the rate of absorption of tetrafluoroethylene, hexafluoropropene (both of which are fluoroolefin monomers), vinylidene fluoride, and trifluoroethylene (both of which are olefinic impurities) in aqueous solutions of sulfuric acid ranging in concentrations from 50 to 98 percent by weight, at temperatures ranging from 20° C. to 150° C., 300 grams of the particular sulfuric acid was charged to a three-necked flask (500-ml.), the flask evacuated, and the particular olefin then introduced until the internal pressure in the flask equaled atmospheric pressure and the pressure gradient measured over the next 5 minutes. The results of these tests, which are summarized in Table I, clearly demonstrate that the olefinic impurities are absorbed in the sulfuric acid solutions at a rate far in excess of the absorption of the fluoroolefin monomers.

of 380° C. for 3 hours, following which heat treatment the tensile strength of each sample at its yielding point was measured on an Amsler Tensile Tester. These measurements were carried out at a strain rate of 80 mm./min. and a temperature of 23° C., using a JIS No. 3 dumbell.

The results of these tests, which are set forth below in Table II, demonstrate that the presence of even minute traces of vinylidene fluoride in monomeric tetrafluoroethylene result in a marked decrease in the tensile strength of any polytetrafluoroethylene produced from such monomer. The test further show that when the vinylidene fluoride is removed from the monomer in accordance with the process of the invention, the resultant polytetrafluoroethylene exhibits better thermal stability than polymers prepared from monomeric tetrafluoroethylene contaminated with the olefinic impurity.

TABLE I.—EFFECT OF VARYING THE SULFURIC ACID CONCENTRATION AND REACTION TEMPERATURE ON THE RATE OF ABSORPTION OF FLUOROOLEFINS

| Temperature (° C.) | Sulfuric Acid Concentration (Percent) | Rate of Adsorption of Fluoroolefins (mm. Hg/min.) | | | |
|---|---|---|---|---|---|
| | | $CF_2=CF_2$ | $CH_2=CF_2$ | $CHF=CF_2$ | $CF_2=CF-CF_3$ |
| 20 | 84 | 0 | 80 | | |
| 20 | 95 | 0 | 410 | | |
| 20 | 98 | 0 | 540 | | 0 |
| 50 | 50 | 0 | 20 | | |
| 50 | 84 | 0 | 150 | | |
| 50 | 95 | 1 | 600 | 25 | |
| 50 | 98 | 1 | 1,380 | | 1 |
| 100 | 70 | 0 | 80 | | |
| 100 | 84 | 0 | 340 | | 0 |
| 100 | 95 | 1 | 1,500 | 33 | 0.4 |
| 100 | 98 | 2 | 4,620 | | |
| 150 | 95 | 10 | 4,620 | | |
| 150 | 98 | 17 | 4,620 | | |

The following examples are illustrative of the improvements which are obtained when fluoroolefin monomers are treated, in accordance with the invention, with aqueous solutions of sulfuric acid to remove the minute traces of olefinic impurities inherently present in such monomers:

*Example I*

Tetrafluoroethylene (100 grams) containing 200 parts per million of vinylidene fluoride was passed into 2000 ml. of 98 percent sulfuric acid, at room temperature and under atmospheric pressure at the rate of 300 cc. of tetrafluoroethylene per minute, yielding 99 grams of purified monomer. No vinylidene fluoride could be detected in the treated monomer using infrared absorption spectrophotometry, which is sufficiently sensitive to detect concentrations as low as 3 parts per million.

To illustrate the effect of minute traces of vinylidene fluoride on the physical properties of polytetrafluoroethylene produced from tetrafluoroethylene containing varying concentrations of this impurity, four polymer samples were prepared under identical reaction conditions by separately polymerizing under redox conditions at 0° C. for 2 hours, using tetrafluoroethylene which contained 0, 3, 22 and 50 parts per million, respectively, of vinylidene fluoride, the monomer containing no vinylidene fluoride being the treated monomer described above. Each polymer sample was crushed, washed with acid, and then dried. Each of the resulting polymer samples was preformed into a test bar under a pressure of 300 kg./cm.$^2$ and then subjected to heat treatment at a temperature TABLE II.—EFFECT OF MINUTE TRACES OF VINYLIDENE FLUORIDE CONTAMINATION IN TETRAFLUOROETHYLENE ON THE PHYSICAL PROPERTIES OF POLYTETRAFLUOROETHYLENE PREPARED FROM SUCH MONOMER

| Concentration of Vinylidene Fluoride in Tetrafluoroethylene Monomer (parts per million) | Tensile Strength at Yielding Point After Heat Treatment of Resulting Polytetrafluoroethylene (kg./cm.$^2$) |
|---|---|
| 0 | 1.55 |
| 3 | 1.29 |
| 22 | 1.26 |
| 50 | 1.23 |

*Example II*

Tetrafluoroethylene, containing 200 parts per million of vinylidene fluoride was treated with 70 percent sulfuric acid at 50° C., using pressures of 5 kg./cm.$^2$. No vinylidene fluoride could be detected in the treated monomer by infrared absorption techniques.

*Example III*

Tetrafluoroethylene (200 grams), containing 5 percent by weight of vinylidene fluoride, was passed through 90 percent sulfuric acid at 150° C. and under atmospheric pressure at the rate of 300 cc. per minute, yielding 198 grams of purified monomer. Infrared analysis of the treated monomer failed to show the presence of any vinylidene fluoride.

Example IV

Tetrafluoroethylene (180 grams), containing 300 parts per million of trifluoroethylene and 800 parts per million of vinylidene fluoride, was treated with 98 percent sulfuric acid at 100° C. and under atmospheric pressure. Neither trifluoroethylene nor vinylidene fluoride could be detected in the treated monomer by infrared analysis.

Example V

Hexafluoropropene (40 grams), containing 0.1 percent by weight of trifluoroethylene, and 1000 ml. of 98 percent sulfuric acid were charged to a shaking autoclave maintained at a temperature of 100° C., and the autoclave then shaken for 5 minutes, following which 39 grams of monomer were withdrawn from the heated autoclave. No trifluoroethylene was detected in the treated monomer, using infrared analysis.

We claim:

1. A process for purifying a fluoroolefin monomer of the group consisting of perfluoroolefins and chloroperfluoroolefins of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such fluoroolefin monomer, which comprises treating the monomer with an aqueous solution of sulfuric acid having a concentration not less than about 50 percent by weight to absorb from the monomer substantially all of such olefinic impurities without substantially absorbing the monomer in the aqueous solution of sulfuric acid, thereby removing substantially all olefinic impurities from the fluoroolefin monomer.

2. A process for purifying a fluoroolefin monomer of the group consisting of monomeric perfluoroolefins and chloroperfluoroolefins of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such fluoroolefin monomer, which comprises treating the monomer with an aqueous solution of sulfuric acid having a concentration in the range between about 50 and about 98 percent by weight to absorb from the monomer substantially all of such olefinic impurities without substantially absorbing the monomer in the aqueous solution of sulfuric acid, thereby removing substantially all olefinic impurities from the fluoroolefin monomer.

3. A process for purifying a fluoroolefin monomer of the group consisting of monomeric perfluoroolefins and chloroperfluoroolefins of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such fluoroolefin monomer, which comprises treating the monomer with an aqueous solution of sulfuric acid having a concentration in the range between about 50 and about 98 percent by weight at a temperature in the range from ambient room temperatures to about 150° C. for a period of time in the range from about 10 seconds to about 30 minutes to absorb from the monomer substantially all of such olefinic impurities without substantially absorbing the monomer in the aqueous solution of sulfuric acid, thereby removing substantially all olefinic impurities from the fluoroolefin monomer.

4. A process for purifying monomeric trifluorochloroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such trifluorochloroethylene monomer, which comprises treating the monomer with an aqueous solution of sulfuric acid having a concentration in the range between about 50 and about 98 percent by weight to absorb from the monomer substantially all of such olefinic impurities without substantially absorbing the monomer in the aqueous solution of sulfuric acid, thereby removing substantially all olefinic impurities from the trifluorochloroethylene monomer.

5. A process for purifying monomeric trifluorochloroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such trifluorochloroethylene monomer, which comprises treating the monomer with an aqueous solution of sulfuric acid having a concentration in the range between about 50 and about 98 percent by weight at a temperature in the range from ambient room temperatures to about 150° C. for a period of time in the range from about 10 seconds to about 30 minutes to absorb from the monomer substantially all of such olefinic impurities without substantially absorbing the monomer in the aqueous solution of sulfuric acid, thereby removing substantially all olefinic impurities from the trifluorochloroethylene monomer.

6. A process for purifying monomeric trifluorochloroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such trifluorochloroethylene monomer, which comprises treating the monomer with an aqueous solution of sulfuric acid having a concentration in the range between about 80 and about 98 percent by weight at a temperature in the range from ambient room temperatures to about 100° C. for a period of time in the range from about 30 seconds to about 10 minutes to absorb from the monomer substantially all of such olefinic impurities without substantially absorbing the monomer in the aqueous solution of sulfuric acid, thereby removing substantially all olefinic impurities from the trifluorochloroethylene monomer.

7. A process for purifying monomeric tetrafluoroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such tetrafluoroethylene monomer, which comprises treating the monomer with an aqueous solution of sulfuric acid having a concentration in the range betwen about 50 and about 98 percent by weight to absorb from the monomer substantially all of such olefinic impurities without substantially absorbing the monomer in the aqueous solution of sulfuric acid, thereby removing substantially all olefinic impurities from the tetrafluoroethylene monomer.

8. A process for purifying monomeric tetrafluoroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such tetrafluoroethylene monomer, which comprises treating the monomer with an aqueous solution of sulfuric acid having a concentration in the range between about 50 and about 98 percent by weight at a temperature in the range from ambient room temperatures to about 150° C. for a period of time in the range from about 10 seconds to about 30 minutes to absorb from the monomer substantially all of such olefinic impurities without substantially absorbing the monomer in the aqueous solution of sulfuric acid, thereby removing substantially all olefinic impurities from the tetrafluoroethylene monomer.

9. A process for purifying monomeric tetrafluoroethylene of the minute traces of olefinic impurities which are characterized by at least on hydrogen atom on one of the unsaturated carbon atoms and contain no elements other than carbon, fluorine, chlorine and hydrogen, and which tend to decrease the thermal stability of any polymer produced from such tetrafluoroethylene monomer, which comprises treating the monomer with an aqueous solution of sulfuric acid having a concentration in the range between about 80 and about 98 percent by weight at a temperature in the range from ambient room temperature to about 100° C. for a period of time in the range from about 30 seconds to about 10 minutes to absorb from the monomer substantially all of such olefinic impurities without substantially absorbing the monomer in the aqueous solution of sulfuric acid, thereby removing substantially all olefinic impurities from the tetrafluoroethylene monomer.

References Cited by the Examiner

Newer Methods of Preparative Organic Chemistry, pages 208–209 (1948), Interscience Publishers, Inc., New York, N.Y.

LEON ZITVER, *Primary Examiner.*

DANIEL D. HORWITZ, *Examiner.*